No. 647,184. Patented Apr. 10, 1900.
W. S. HAMM.
ELECTRIC HEADLIGHT.
(Application filed Jan. 17, 1900.)

(No Model.) 2 Sheets—Sheet 1.

Attest
E. B. Lehman
Fred. E. Keeley

Inventor
William S. Hamm
By J. Kirby Jr.
His Att'y.

No. 647,184. Patented Apr. 10, 1900.
W. S. HAMM.
ELECTRIC HEADLIGHT.
(Application filed Jan. 17, 1900.)
(No Model.) 2 Sheets—Sheet 2.
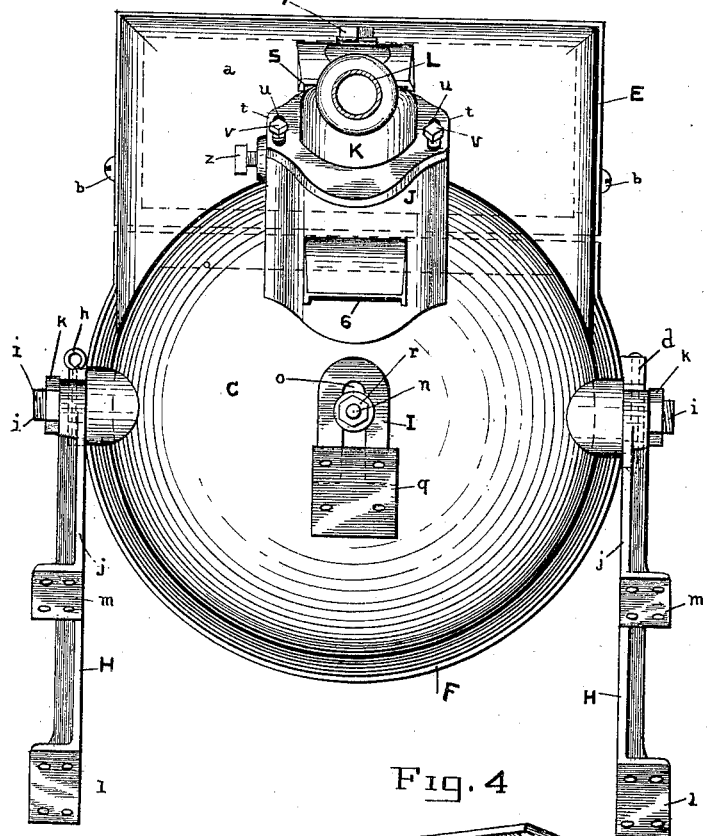
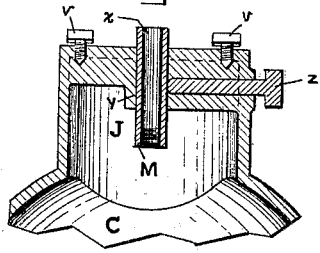
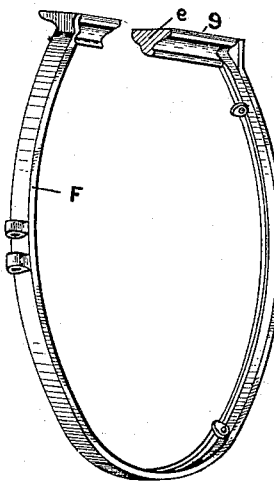
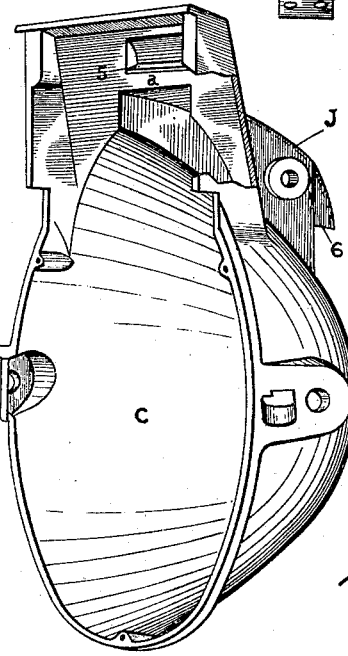
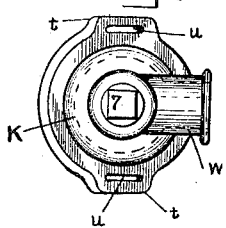
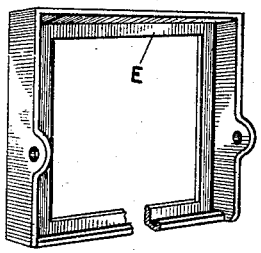
Attest
E. B. Lehman
Fred. E. Keeley.
Inventor
William S. Hamm
By J. Kirby
His Atty.
THE NORRIS PETERS CO., PHOTO-LITHO., WASHINGTON, D. C.

UNITED STATES PATENT OFFICE.

WILLIAM S. HAMM, OF CHICAGO, ILLINOIS, ASSIGNOR TO THE UNITED STATES HEAD-LIGHT COMPANY, OF BUFFALO, NEW YORK.

ELECTRIC HEADLIGHT.

SPECIFICATION forming part of Letters Patent No. 647,184, dated April 10, 1900.

Application filed January 17, 1900. Serial No. 1,774. (No model.)

*To all whom it may concern:*

Be it known that I, WILLIAM S. HAMM, a citizen of the United States, residing at Chicago, in the county of Cook and State of Illinois, have invented certain new and useful Improvements in Electric Headlights; and I do hereby declare that the following is a full, clear, and exact description of the invention.

My invention relates to headlights of the class more particularly adapted to be mounted upon the hoods of electrically-propelled passenger-cars, and has for its object to provide an improved and novel type of such headlights in which an electric lamp, together with signal characters adapted to be illuminated by light from within the case of the headlight, are employed, and whereby provision is made for adjusting the headlight to various forms of hoods and to various angles thereto.

The invention consists in certain novel features of construction and arrangement of parts, as shown in the accompanying drawings, forming a part hereof, and which will be hereinafter fully described, and pointed out in the claims at the end of this specification.

Figure 3:
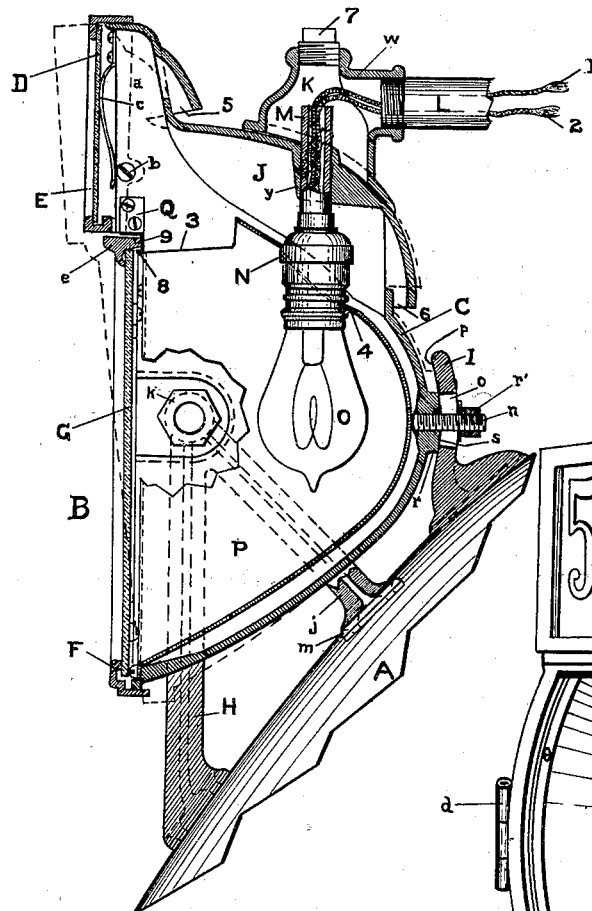
Figures 8, 11:
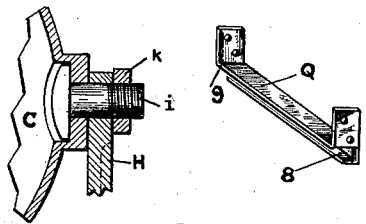
Figure 1:
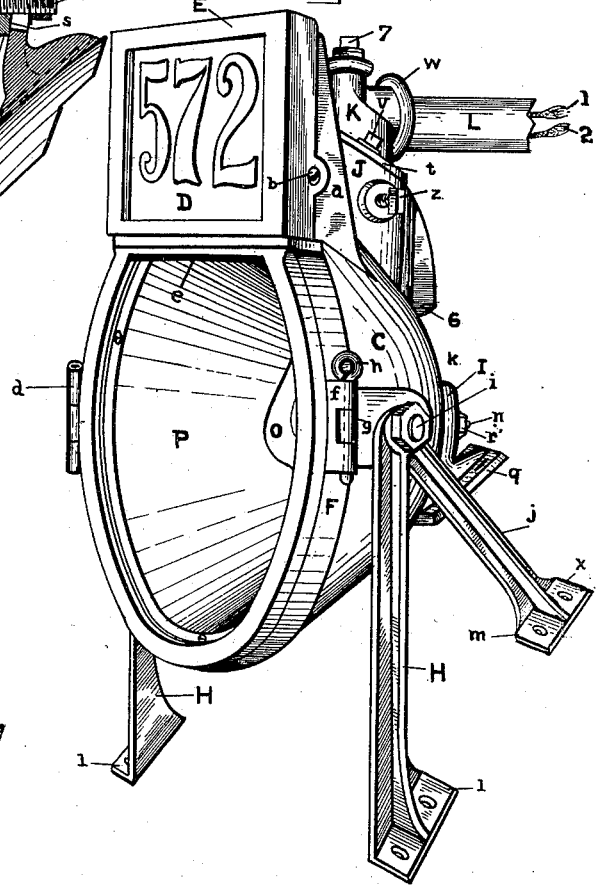
Figure 9:
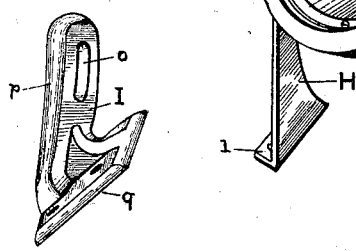

In the drawings, Figure 1 is a front perspective view of the headlight; Fig. 2, a rear elevation thereof; Fig. 3, a vertical sectional view through the center of the headlight, showing also a portion of the hood of a car with the headlight mounted in a vertical position thereon, the dotted lines representing the headlight in a slightly-tilted position; Fig. 4, a broken perspective view of the case alone; Fig. 5, a detached perspective view of the hinged glass-holder, partially in section, looking at the inside thereof; Fig. 6, an inside perspective view of the signal-plate holder, partially in section, detached from the case; Fig. 7, a top view of the conduit-receiver detached from the case; Fig. 8, a vertical sectional view through one side of the case, showing the manner of connecting the standards to the case; Fig. 9, a rear perspective view of the back-supporting standard; Fig. 10, a vertical section through the receiver-housing, showing the adjustable socket-holder and manner of securing the same in position; and Fig. 11, a perspective view of the weather-guard.

Similar letters and numerals of reference indicate corresponding parts throughout the drawings.

A represents the hood of a passenger-car, and B the headlight mounted thereon.

C represents the case, the front of which is open and which is made of metal, preferably of the form shown in Fig. 4, and cast in a single piece. At the top of the case and in open communication with the interior thereof there is formed an extension or housing $a$, which may also be termed a "signal-chamber," the open front of which is closed by a transparent, translucent, or other signal-bearing plate D, held in a frame E, which is secured to the said housing by screws $b$, as clearly indicated in Figs. 1 and 2, or which may be otherwise secured thereto, the plate D being held against the said frame by springs $c$, secured to the ends of the housing on the inside thereof, as shown in Fig. 3.

To the front of the case is hinged at $d$ a glass-holder F, having a horizontal flat portion $e$, corresponding with and adapted to close under the under side of the frame E, but being otherwise of usual construction and containing a glass disk G and being held closed by a fastening consisting of the parts $f$, $g$, and $h$ in a manner which will be understood without further description.

At each side of the case there is provided a horizontally-projecting stud $i$, upon which standards H, having branches $j$, are pivotally mounted, the standards being secured on the studs by nuts $k$ and to the hood of a car by feet $l$ $m$. The said branches $j$ are not, however, essential to the carrying out of my invention, as the single standards H will suffice to support the headlight at this point; but I prefer to employ the type shown and described. At the back of the case there is also a horizontal projecting stud $n$, which engages a slot $o$ in a standard I, having a curved bearing-surface $p$ and provided with a foot-piece $q$, adapted to be secured to the hood. The back of the case is provided with a projection or boss $r$, having a curved face $s$ corresponding to the curved bearing-surface $p$ of the boss r, a nut r' being employed to secure the standard I firmly to the case when the same is adjusted to the desired position, which is accomplished through the pivotal connection of the standards H with the case C and the stud n, movable in the slot o.

At the top of the case and rising upwardly therefrom there is formed a receiver-housing J, having a portion of its top curved to the same radius as the hereinbefore-described bearing-surface p of the standard I, and which radius is struck from the center of the stud i. Mounted on the said curved top of the housing J is a hollow conduit-receiver K, whose bottom is correspondingly curved and provided with ears t, slotted at u to receive screws v, which are tapped into the top of the housing J, and by which the receiver is adjustably secured thereto. The receiver is provided with a neck w, into which a pipe or other conduit L is screwed or otherwise secured and which may extend along the roof of the car or to any part thereof. A vertically-movable socket-holder M, having a central bore x, is movably held in a sleeve y, which projects downwardly from the top of the receiver-housing, by means of a set-screw z, as clearly indicated in Fig. 10. The lower end of this socket-holder carries a socket N, to which are connected conducting-wires 1 2, leading from the source of electric current, and which pass through the conduit L and socket-holder M and convey the current to an incandescent electric lamp O, carried by said socket in the usual manner. A parabolic reflector P, having a cut-away portion 3 to permit light to be reflected into the signal-chamber and having a perforation 4, is secured within the case, the center of said perforation being in line with the focal point of the reflector and immediately under the sleeve y, and through which the lamp-socket and its holder are placed in position and the lamp suspended and properly adjusted within and to the focus of the reflector, as best illustrated in Fig. 3.

Protected openings 5 and 6 are provided in the case for the free escape of heat generated by the lamp, and an opening closed by a cap or plug 7 is provided in the receiver K for convenience in arranging the conducting-wires.

It will be observed that the frame E projects beyond the face of the glass-holder F, the object of which is to protect the interior of the headlight against rain and snow, which might otherwise beat in between the lower side of the frame E and the flattened portion of the glass-holder F, and as a further protection against which a sheet-metal weather-guard Q, having a groove 8, with which a lip 9 of the flat portion e of the glass-holder engages, is secured to the ends of the housing a, and which guard extends across the open end of said housing.

The signal characters, which may be of any desired designation, are illuminated by light reflected from the lamp through the cut-away portion of the reflector against the rear side of the plate bearing the same.

As hereinbefore intimated, it is sometimes desirable to tilt the headlight slightly in order that the reflected light may be directed to strike the ground at a greater or less distance ahead, and it will be apparent from the foregoing description of my invention that the headlight can be tilted to accommodate such conditions and that when set in the desired position it can be securely fastened there, while the conduit for the conducting-wires may be permanently secured on a horizontal line; also, that the standards upon which the headlight is mounted will accommodate themselves to considerable variation in forms of hoods.

I have shown and described what I consider the best manner of carrying out my invention, in doing which and in order to provide a substantial structure I cast the case C, the signal-chamber a, and the housing J in a single piece.

It is obvious that other details of construction may be modified in various ways without departing from the spirit of the invention, and therefore I do not limit the invention to such exact structural details.

Having thus fully described my invention, I claim—

1. In an electric headlight, the combination of a case mounted on standards adapted to be secured to a car structure, a parabolic reflector secured within the case, a conduit-receiver adjustably secured to the case, a conduit engaging said receiver, and an incandescent electric lamp located within the reflector, substantially as set forth.

2. In an electric headlight, the combination of a case mounted on standards adapted to be secured to a car structure, a parabolic reflector secured within the case, a conduit-receiver adjustably secured to the case, a conduit engaging said receiver, an incandescent electric lamp located within the reflector, and means for adjusting the lamp to the focus of the reflector, substantially as set forth.

3. In an electric headlight, the combination of a case tiltably mounted on standards adapted to be secured to a car structure, means for securing the case on said standards in a tilted position, a parabolic reflector secured within the case, a conduit-receiver adjustably secured to the case, a conduit engaging said receiver, and an incandescent electric lamp located within the reflector, substantially as set forth.

4. In an electric headlight, the combination of a case tiltably mounted on standards adapted to be secured to a car structure, means for securing the case on said standards in a tilted position, a parabolic reflector secured within the case, a conduit-receiver adjustably secured to the case, a conduit engaging said receiver, an incandescent electric lamp located within the reflector, and an adjustable socket-holder carrying the lamp-socket and lamp, whereby the lamp can be adjusted to the focus of the reflector, substantially as set forth.

5. In an electric headlight, the combination of a case having a signal-chamber in open communication with the interior thereof and provided with a signal-plate adapted to be illuminated by light from within the case, a parabolic reflector secured within the case, a conduit-receiver adjustably secured to the case, a conduit engaging said receiver, an incandescent electric lamp within the reflector, and means for securing the headlight to a car structure, the said reflector having a cut-away portion to permit light to be reflected into said signal-chamber, substantially as set forth.

6. In an electric headlight, the combination of a case having a signal-chamber in open communication with the interior thereof and provided with a signal-plate adapted to be illuminated by light from within the case, a parabolic reflector secured within the case, a conduit-receiver adjustably secured to the case, a conduit engaging said receiver, an incandescent electric lamp adjustable within the reflector, and means for adjustably securing the headlight to a car structure, the said reflector having a cut-away portion to permit light to be reflected into said chamber, substantially as set forth.

7. In a headlight, the combination of a case having an open front, a signal-chamber located at the upper front portion and being in open communication with the interior of the case, the said chamber having an open front covered by a signal-plate held in a frame attached to said chamber, a glass-holder attached to the case and containing a glass disk adapted to close the said open front of the case, the said glass-holder having a section corresponding to the under side of said frame and adapted to close thereunder, a parabolic reflector secured within the case and having a lamp therein and a cut-away portion through which light is reflected into said chamber and said signal-plate illuminated thereby, and means for securing the headlight to a car structure, substantially as set forth.

8. In a headlight, the combination of a case having an open front, a signal-chamber located at the upper front portion and being in open communication with the interior of the case, the said chamber having an open front covered by a signal-plate held in a frame attached to said chamber, a weather-guard extending horizontally across said chamber at the bottom thereof, a glass-holder attached to the case and containing a glass disk adapted to close the said open front of the case, the said glass-holder having a section corresponding to the under side of said frame and a lip adapted to close thereunder and to engage said guard, a parabolic reflector secured within the case and having a lamp therein and a cut-away portion through which light is reflected into said chamber and said signal-plate illuminated thereby, and means for securing the headlight to a car structure, substantially as set forth.

9. The combination with the hood of a passenger-car, the standards H secured to said hood, a headlight having a case pivotally mounted in said standards, projecting stud $n$ secured to the back of the headlight-case, the standard I secured to said hood and having slot $o$ to receive said stud, means engaging said stud for adjustably securing said case to said standard I, a conduit-receiver adjustably secured to said case at the top thereof, and a horizontally-disposed conduit engaging said conduit-receiver, substantially as set forth.

In testimony whereof I hereunto subscribe my name this 13th day of January, A. D. 1900.

WILLIAM S. HAMM.

Witnesses:
G. H. ENGILS,
HENRY O. MILLER.